United States Patent
Huang

(10) Patent No.: US 12,307,812 B2
(45) Date of Patent: May 20, 2025

(54) SYSTEM AND METHOD FOR PERSONALITY PREDICTION USING MULTI-TIERED ANALYSIS

(71) Applicant: Perfect Mobile Corp., New Taipei (TW)

(72) Inventor: Yung-Han Huang, Taipei (TW)

(73) Assignee: PERFECT MOBILE CORP., New Taipei (TW)

( * ) Notice: Subject to any disclaimer, the term of this patent is extended or adjusted under 35 U.S.C. 154(b) by 479 days.

(21) Appl. No.: 17/729,226

(22) Filed: Apr. 26, 2022

(65) Prior Publication Data
US 2022/0358786 A1 Nov. 10, 2022

Related U.S. Application Data

(60) Provisional application No. 63/188,984, filed on May 14, 2021, provisional application No. 63/186,873, (Continued)

(51) Int. Cl.
*G06V 40/16* (2022.01)
*G06F 16/901* (2019.01)
(Continued)

(52) U.S. Cl.
CPC ........ *G06V 40/168* (2022.01); *G06F 16/9024* (2019.01); *G06N 3/045* (2023.01); *G06V 10/82* (2022.01); *G06V 40/161* (2022.01)

(58) Field of Classification Search
CPC .. G06V 40/161; G06V 40/168; G06V 40/171; G06V 40/165; G06V 10/82;
(Continued)

(56) References Cited

U.S. PATENT DOCUMENTS 8,208,694 B2 6/2012 Jelonek et al.
9,122,752 B2 9/2015 Bill
(Continued)

FOREIGN PATENT DOCUMENTS

CN 104680118 A * 6/2015 ........... G06K 9/6282
CN 108596646 A 9/2018
(Continued)

OTHER PUBLICATIONS

Giulio Costantini, Sacha Epskamp, Denny Borsboom, Marco Perugini, René Möttus, Lourens J. Waldorp, Angélique O.J. Cramer, State of the aRt personality research: A tutorial on network analysis of personality data in R, Journal of Research in Personality, vol. 54, pp. 13-29 (Year: 2015).*

(Continued)

*Primary Examiner* — Gandhi Thirugnanam
*Assistant Examiner* — Anna Lei
(74) *Attorney, Agent, or Firm* — McClure, Qualey & Rodack, LLP

(57) ABSTRACT

A computing device obtains an image of a user and detects a facial region of the user within the image. The computing device detects facial landmark points within the facial region and extracts facial features based on the detected facial landmark points. The computing device calculates traits of the user based on the extracted facial features and calculates one or more personality types of the user based on the traits of the user.

16 Claims, 14 Drawing Sheets

Related U.S. Application Data filed on May 11, 2021, provisional application No. 63/201,570, filed on May 5, 2021.

(51) Int. Cl.
  *G06N 3/045* (2023.01)
  *G06V 10/82* (2022.01)

(58) Field of Classification Search
  CPC ........ G06V 10/764; G06T 2207/30201; G06T 7/90; G06N 20/00; G06N 3/045; G06N 3/02; G06N 3/0464; G06N 5/01; G06F 16/9027; G06F 16/2246; G06F 16/322; G06F 16/9024; A45D 44/005; A45D 2044/007; G06Q 30/0631
  See application file for complete search history.

(56) References Cited

U.S. PATENT DOCUMENTS

| | | | |
|---|---|---|---|
| 9,449,221 | B2 | 9/2016 | Gunjan |
| 9,519,927 | B1 | 12/2016 | Tuan et al. |
| 9,760,935 | B2 | 9/2017 | Aarabi |
| 9,922,243 | B2 * | 3/2018 | McVey .................. G06V 40/10 |
| 9,965,553 | B2 | 5/2018 | Lyren |
| 10,134,083 | B2 | 11/2018 | Adeyoola et al. |
| 10,346,901 | B1 | 7/2019 | Serbanescu |
| 10,380,603 | B2 | 8/2019 | Grigsby et al. |
| 10,395,300 | B2 | 8/2019 | Chong et al. |
| 10,497,148 | B2 | 12/2019 | Shen et al. |
| 10,574,883 | B2 | 2/2020 | Purwar et al. |
| 10,607,264 | B2 | 3/2020 | Lin et al. |
| 10,672,055 | B2 | 6/2020 | Hsiao et al. |
| 10,719,729 | B2 | 7/2020 | Kuo et al. |
| 10,818,007 | B2 | 10/2020 | Purwar et al. |
| 10,866,716 | B2 | 12/2020 | Sinclair et al. |
| 10,939,742 | B2 | 3/2021 | Fu et al. |
| 2012/0002848 | A1 * | 1/2012 | Hill .......................... G16Z 99/00 382/118 |
| 2015/0356661 | A1 | 12/2015 | Rousay |
| 2018/0075483 | A1 | 3/2018 | Boyarshinov |
| 2019/0266655 | A1 | 8/2019 | Desikan et al. |
| 2020/0134371 | A1 | 4/2020 | Charraud et al. |
| 2021/0015240 | A1 | 1/2021 | Elfakhri et al. |
| 2021/0366023 | A1 * | 11/2021 | Maldonado ........ G06Q 30/0631 |
| 2022/0075994 | A1 * | 3/2022 | Shapira .................... G06N 3/08 |

FOREIGN PATENT DOCUMENTS

| | | | | |
|---|---|---|---|---|
| CN | 108985174 | A | | 12/2018 |
| CN | 109409196 | A * | 3/2019 | ......... G06K 9/00288 |
| CN | 109902201 | A | | 6/2019 |
| CN | 110033344 | A | | 7/2019 |
| CN | 110960036 | A | | 4/2020 |
| CN | 109754317 | B | | 11/2020 |
| IN | 109902201 | A | | 6/2019 |
| KR | 10-2012-046653 | A | | 5/2012 |
| KR | 10-2014-031429 | A | | 3/2014 |
| KR | 10-2184177 | B1 | | 11/2020 |
| WO | WO-2019221739 | A1 * | 11/2019 | ......... G06K 9/00281 |

OTHER PUBLICATIONS

Ahaskar, A.; "Cosmetics Companies Are Leveraging AI To Alter The Face Of Beauty;" Mint; https://www.livemint.com/technology/apps/cosmetics-companies-are-leveraging-ai-to-alter-the-face-of-beauty-11570720487308.html; Oct. 2019; pp. 1-6.

De Jesus, A.; "Artificial Intelligence For Beauty And Cosmetics—Current Applications;" E-Commerce; Consumer Goods; https://emerj.com/ai-sector-overviews/artificial-intelligence-for-beauty-and-cosmetics-current-applications/; Mar. 2020; pp. 1-15.

Geria, N.M.; "The Rise Of Artificial Intelligence In Personalized Skin Care;" Happi Magazine, Anti-Aging and Cosmeceutical Corner; https://www.happi.com/issues/2020-05-01/view_anti-aging-cosmeceutical_comer/the-rise-of-artificial-intelligence-in-personalized-skin-care/; May 2020; pp. 1-12.

Solanki, S., et al.; "Deep Learning Methods For Selecting Appropriate Cosmetic Products For Various Skin Types: A Survey;" International Research Journal of Engineering and Technology (IRJET); vol. 06; Issue 12; Dec. 2019; pp. 1-4.

* cited by examiner

SYSTEM AND METHOD FOR PERSONALITY PREDICTION USING MULTI-TIERED ANALYSIS

CROSS-REFERENCE TO RELATED APPLICATION

This application claims priority to, and the benefit of, U.S. Provisional Patent Application entitled, "Recommender system with personal facial feature," having Ser. No. 63/201,570, filed on May 5, 2021; U.S. Provisional Patent Application entitled, "Personality Predictor," having Ser. No. 63/186,873, filed on May 11, 2021; and U.S. Provisional Patent Application entitled, "Personality Prediction System," having Ser. No. 63/188,984, filed on May 14, 2021, which are incorporated by reference in their entireties.

TECHNICAL FIELD

The present disclosure generally relates to systems and methods for performing multi-layer analysis for personality prediction.

SUMMARY

In accordance with one embodiment, a computing device obtains an image of a user and detects a facial region of the user within the image. The computing device detects facial landmark points within the facial region and extracts facial features based on the detected facial landmark points. The computing device calculates a plurality of traits based on the extracted facial features and calculates at least one personality type of the user based on the plurality of traits.

Another embodiment is a system that comprises a memory storing instructions and a processor coupled to the memory. The processor is configured by the instructions to obtain an image of a user and detect a facial region of the user within the image. The processor is further configured to detect facial landmark points within the facial region and extract facial features based on the detected facial landmark points. The processor is further configured to calculate a plurality of traits based on the extracted facial features and calculate at least one personality type of the user based on the plurality of traits.

Another embodiment is a non-transitory computer-readable storage medium storing instructions to be implemented by a computing device. The computing device comprises a processor, wherein the instructions, when executed by the processor, cause the computing device to obtain an image of a user and detects a facial region of the user within the image. The processor is further configured to detect facial landmark points within the facial region and extract facial features based on the detected facial landmark points. The processor is further configured to calculate a plurality of traits based on the extracted facial features and calculate at least one personality type of the user based on the plurality of traits.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Various aspects of the disclosure can be better understood with reference to the following drawings. The components in the drawings are not necessarily to scale, with emphasis instead being placed upon clearly illustrating the principles of the present disclosure. Moreover, in the drawings, like reference numerals designate corresponding parts throughout the several views.

DETAILED DESCRIPTION

The present disclosure is directed to systems and methods for predicting a personality type of a user using multi-tiered analysis where facial landmark points in the user's facial region are identified and analyzed. Target attributes of the identified landmark points are extracted and mapped to character traits using a decision tree algorithm. A shortest path algorithm is applied to the mapped character traits to predict the personality of the user. Assessing the personality of an individual may be particularly useful for such applications as recommending products and identifying potential customers for products.

Figure 1:
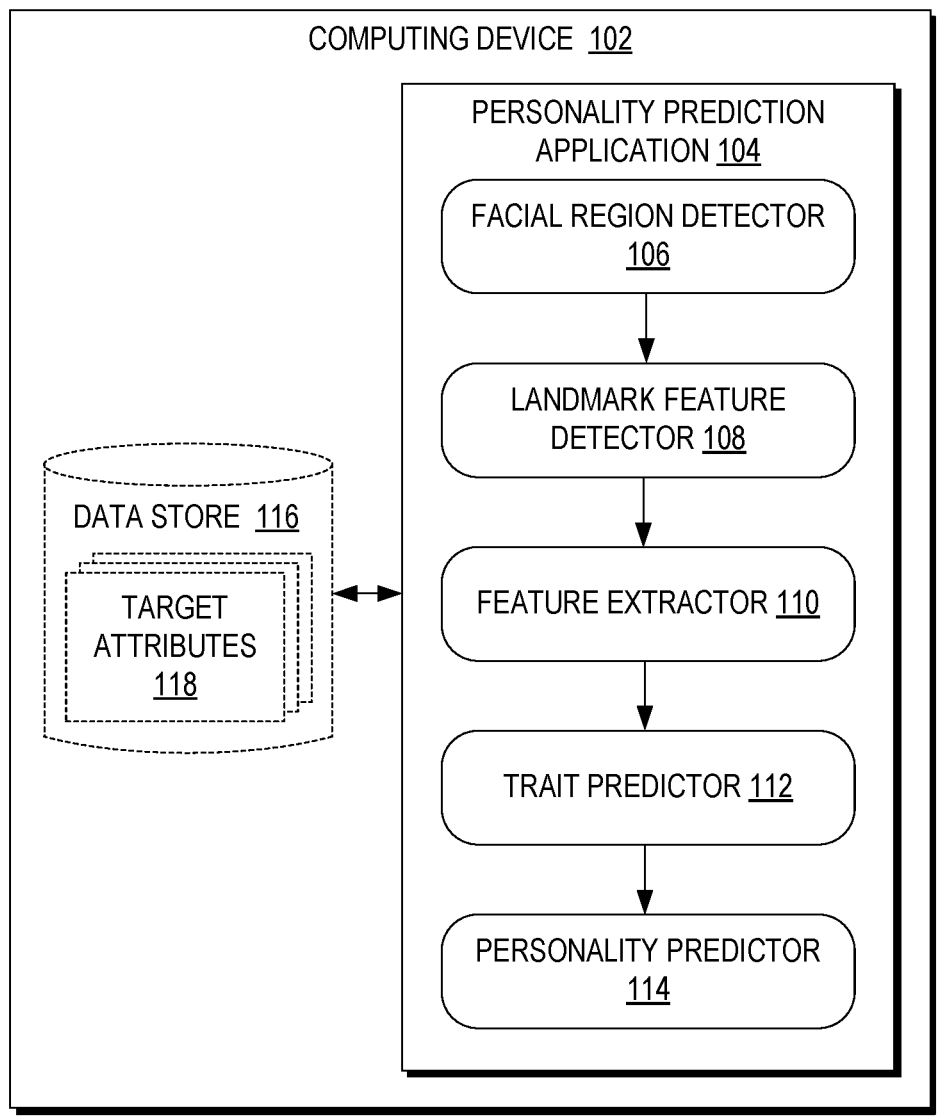
FIG. 1 is a block diagram of a computing device configured to predict a personality type using multi-tiered analysis according to various embodiments of the present disclosure.

A description of a system for implementing multi-tiered analysis for predicting a personality type is described followed by a discussion of the operation of the components within the system. FIG. 1 is a block diagram of a computing device 102 in which the embodiments disclosed herein may be implemented. The computing device 102 may be embodied as a computing device such as, but not limited to, a smartphone, a tablet computing device, a laptop, and so on. A personality prediction application 104 executes on a processor of the computing device 102 and includes a facial region detector 106, a landmark feature detector 108, a feature extractor 110, a trait predictor 112, and a personality predictor 114.

The facial region detector 106 is configured to cause a camera (e.g., front-facing camera) of the computing device 102 to capture an image or a video of a user of the computing device 102 for analyzing facial feature attributes and for predicting the personality type of the user. Alternatively, the facial region detector 106 may obtain an image or video of the user from another device. The image may be encoded in any of a number of formats including, but not limited to, JPEG (Joint Photographic Experts Group) files, TIFF (Tagged Image File Format) files, PNG (Portable Network Graphics) files, GIF (Graphics Interchange Format) files, BMP (bitmap) files or any number of other digital formats.

The video may be encoded in formats including, but not limited to, Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), QuickTime (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Media Audio (WMA), 360 degree video, 3D scan model, or any number of other digital formats.

Figure 4:
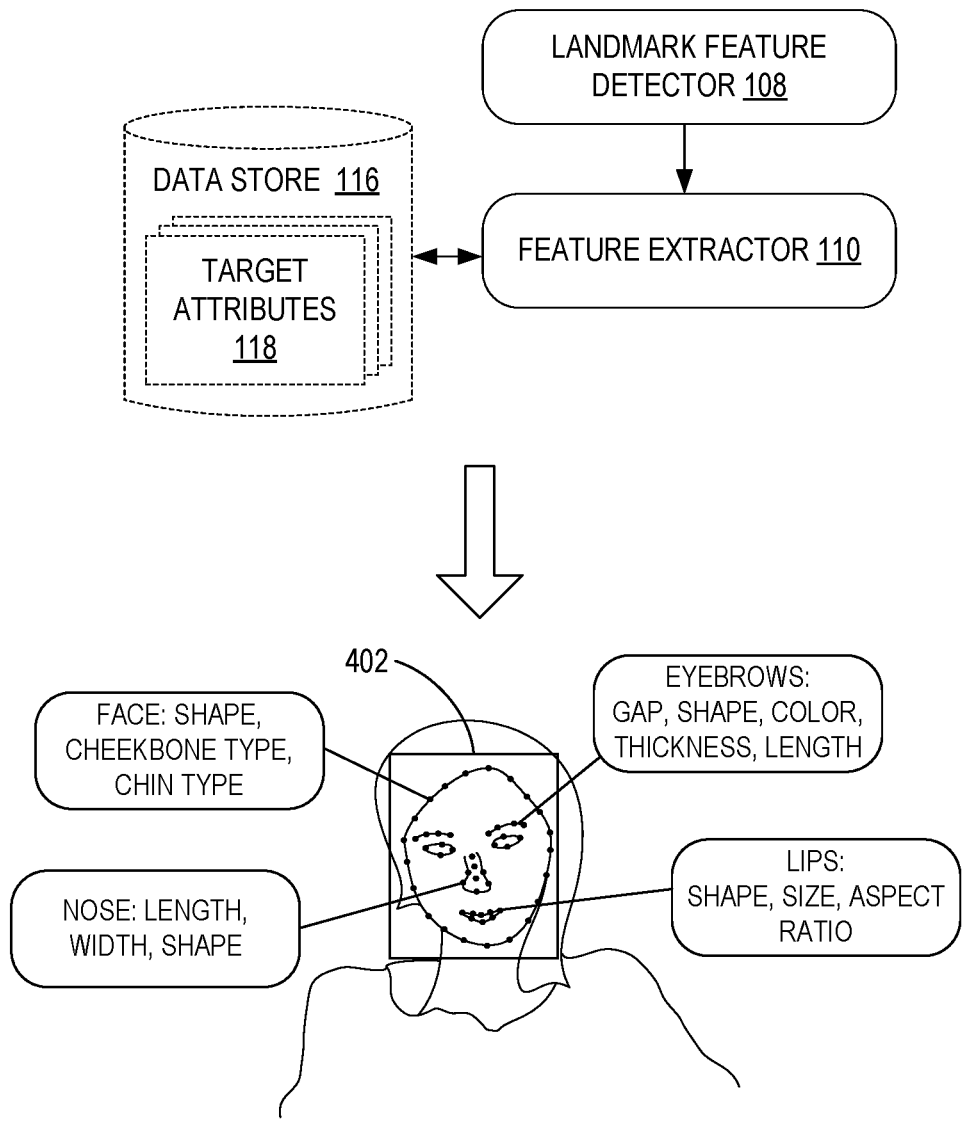
FIG. 4 illustrates example target attributes for various facial landmark points utilized by the computing device of FIG. 1 according to various embodiments of the present disclosure.

The facial region detector 106 is further configured to detect a facial region of the user within the image or video. For some embodiments, the facial region detector 106 obtains a convolutional neural network model trained using images of facial regions and then processes the image of the user using the convolutional neural network model to output the facial region. With reference to FIG. 4, the facial region detector 106 utilizes the convolutional neural network model to define a bounding box 402 around the facial region of the input image. The landmark feature detector 108 is configured to utilize a second convolutional neural network model to output the specific locations of facial landmark points such as the eyes, eyebrows, nose, and so on within the identified facial region, as represented by the dots shown in FIG. 4.

Referring back to FIG. 1, the feature extractor 110 is configured to extract facial features based on the detected facial landmark points. For some embodiments, the feature extractor 110 extracts the facial landmark points by accessing a data store 116 in the computing device 102 and retrieving pre-defined target attributes 118 specified for each of the facial landmark points. The feature extractor 110 then applies a deep learning model to analyze the facial landmark points and to obtain data for each of the target attributes 118 obtained from the data store 116. As an example, the feature extractor 110 applies the deep learning model to determine such as attributes as the length, width, and general shape of the nose. FIG. 4 illustrates other example target attributes for various facial landmark points.

Figure 5:
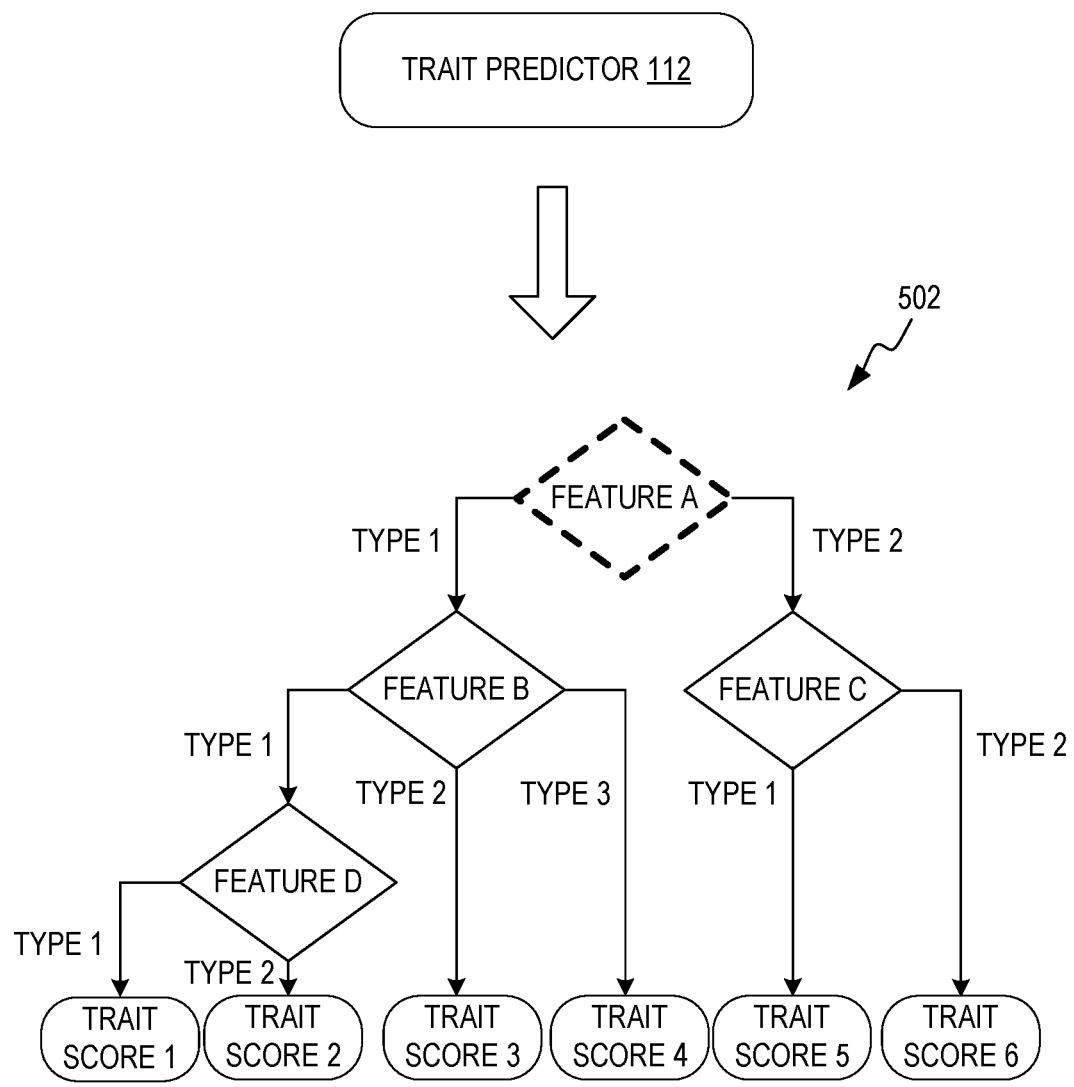
FIG. 5 illustrates an example of a decision tree where the nodes represent various facial features according to various embodiments of the present disclosure.

Referring back to FIG. 1, the trait predictor 112 is configured to calculate a plurality of traits based on the extracted facial features. For some embodiments, the trait predictor 112 predicts the plurality of traits based on the facial landmark points by generating a plurality of decision trees based on the facial landmark points. FIG. 5 illustrates an example of one decision tree 502 where the nodes represent various facial features (e.g., Feature A). For some embodiments, the trait predictor 112 generates different decision trees 502 based on a different root node. In the example shown in FIG. 5, Feature A is used as the root node. Note that other decision trees may be generated where other facial landmark points (e.g., Feature B) are designated as the root node. The decision trees may be generated based on different combinations of facial features and/or different orders of facial features, where a root node of each decision tree corresponds to a different facial feature. Different trait scores are then obtained for the different decision trees. The use of different decision trees to generate different trait scores aids in providing a more accurate prediction of the user's personality type.

Figure 6:
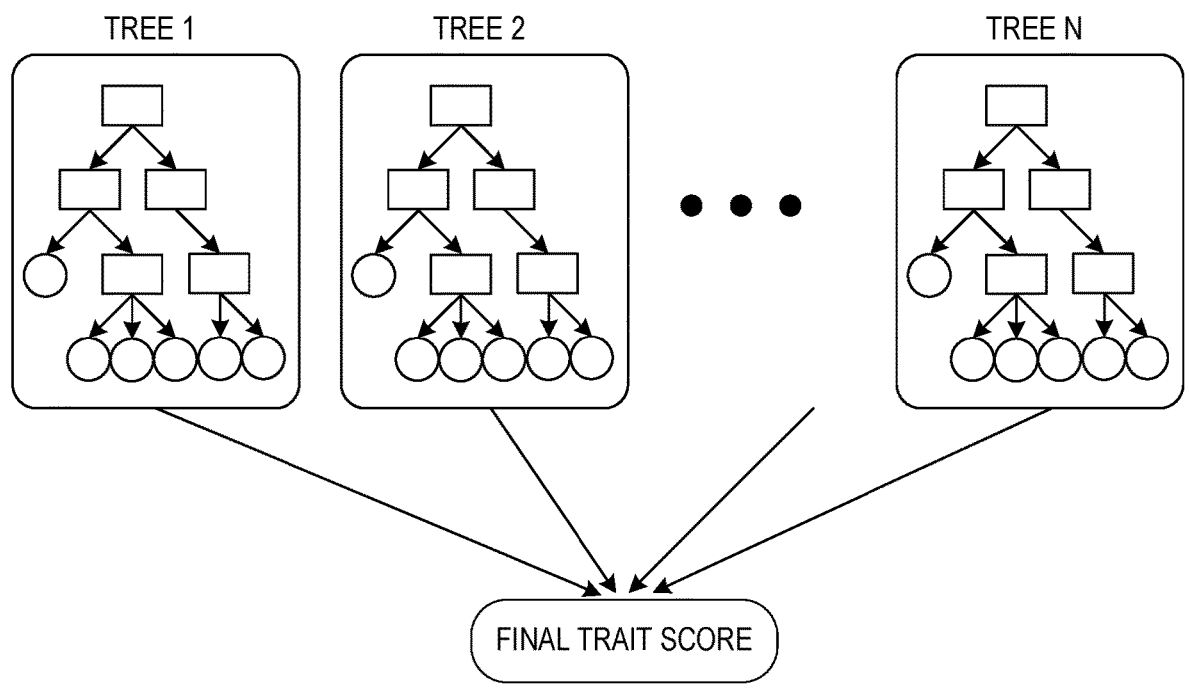
FIG. 6 illustrates a first method for calculating a weighted sum of all the trait scores to generate a final trait score according to various embodiments of the present disclosure.

FIG. 6 illustrates a first method for calculating a weighted sum of all the trait scores to generate a final trait score. In accordance with such embodiments, the trait predictor 112 calculates a weighted sum of all the trait scores from Tree 1 to Tree N to generate a final trait score and determines at least one dominant trait based on the final trait score. The weighted sum of the plurality of trait scores may be calculated using an average of the plurality of trait scores, a square of the sum of the plurality of trait scores, or a square root of the sum of the plurality of trait scores.

Figure 7:
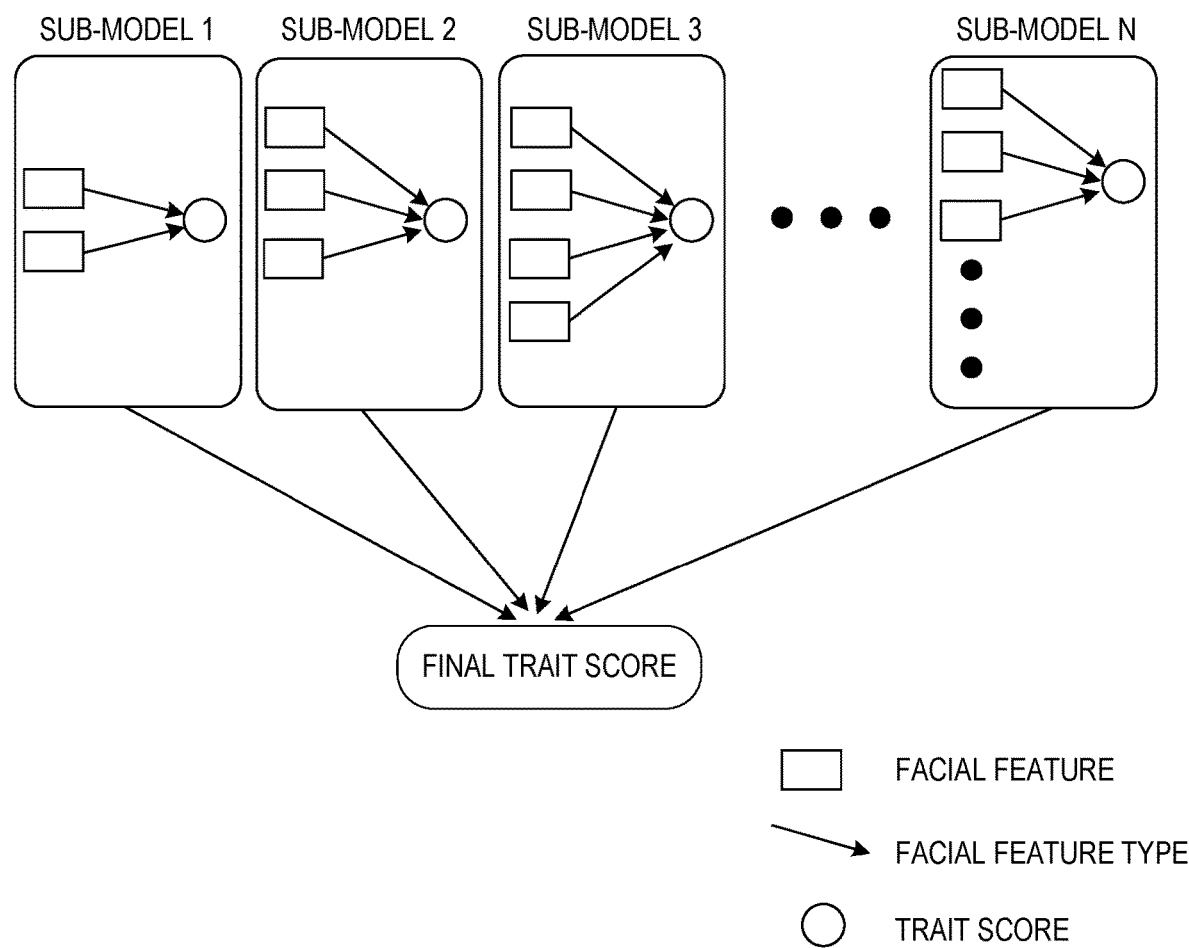
FIG. 7 illustrates a second method for calculating a weighted sum of all the trait scores to generate a final trait score according to various embodiments of the present disclosure.

FIG. 7 illustrates a second method for calculating a weighted sum of all the trait scores to generate a final trait score. In accordance with such embodiments, the trait predictor 112 utilizes various sub-models, where a single trait score is calculated for each sub-model. As shown, each sub-model corresponds to a different number of facial features for calculating a corresponding trait score. The trait predictor 112 then calculates a weighted sum of all the trait scores from sub-model 1 to sub-model N to generate a final trait score and determines at least one dominant trait based on the final trait score. The weighted sum of the plurality of trait scores may be calculated using an average of the plurality of trait scores, a square of the sum of the plurality of trait scores, or a square root of the sum of the plurality of trait scores.

Figure 8:
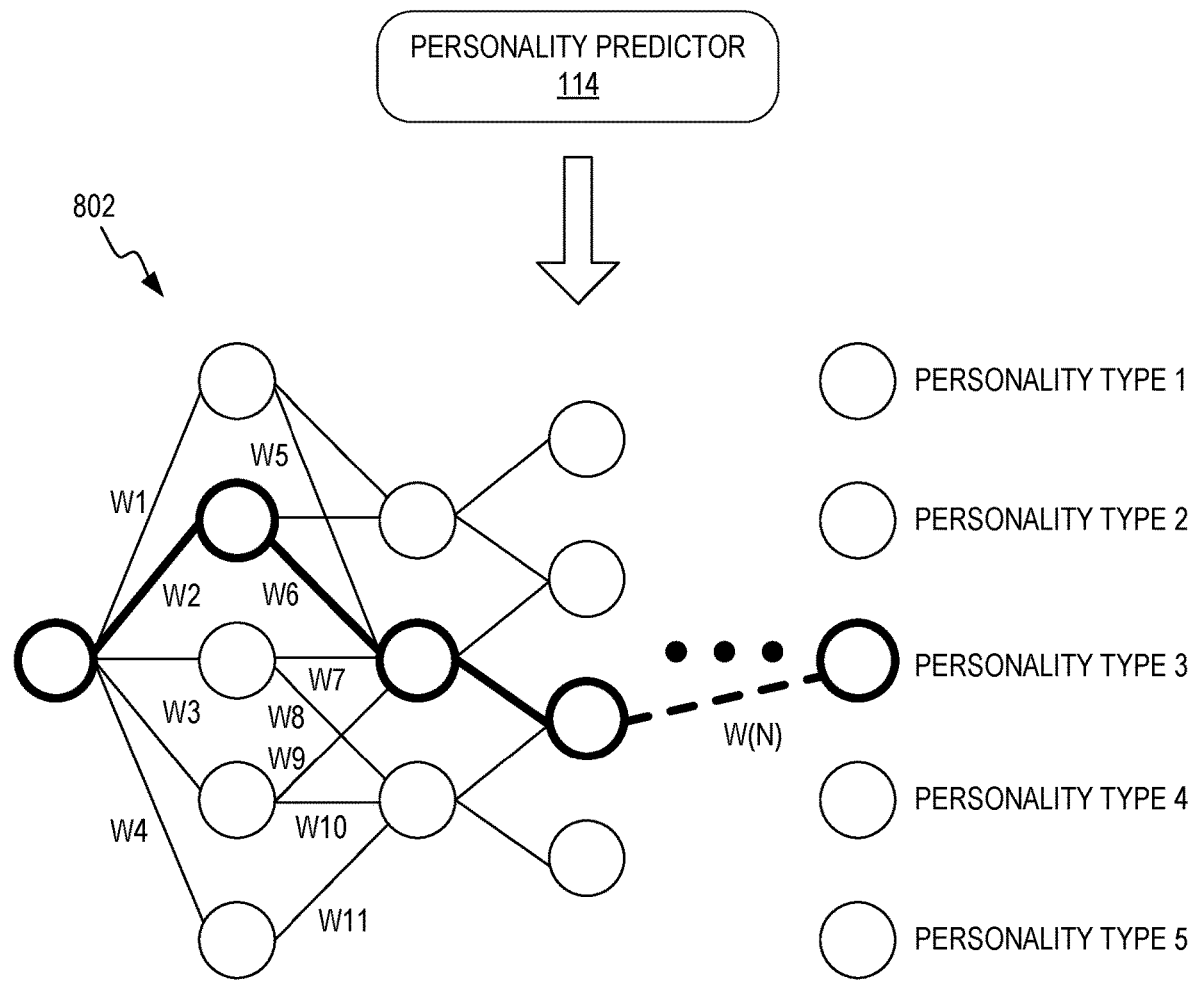
FIG. 8 illustrates an example graph, where each node of the graph corresponds to a trait score according to various embodiments of the present disclosure.

Referring back to FIG. 1, the personality predictor 114 is configured to calculate at least one personality type of the user based on the plurality of traits. The personality predictor 114 predicts the personality of the user based on the plurality of traits by generating a graph, where a connection between each pair of nodes of the graph corresponds to a trait score from among a grouping of the trait scores calculated from the weighted sum. FIG. 8 illustrates an example graph 802, where each path (W1 ... Wn) of the graph 802 corresponds to a weight value (in the final trait score) calculated by the trait predictor 112 (FIG. 1). The personality predictor 114 applies a shortest path algorithm to the graph 802 of trait scores and predicts the personality of the user based on the trait scores corresponding to a shortest path identified by the shortest path algorithm. The value associated with each path (W1, W2, ... W(N)) in the graph 802 represents the weight value of a corresponding trait pair (for example, FANTASY—FEELINGS:5 in FIG. 11 and FIG.

12). In some embodiments, pre-determined weight values are assigned to each trait score.

Figure 2:
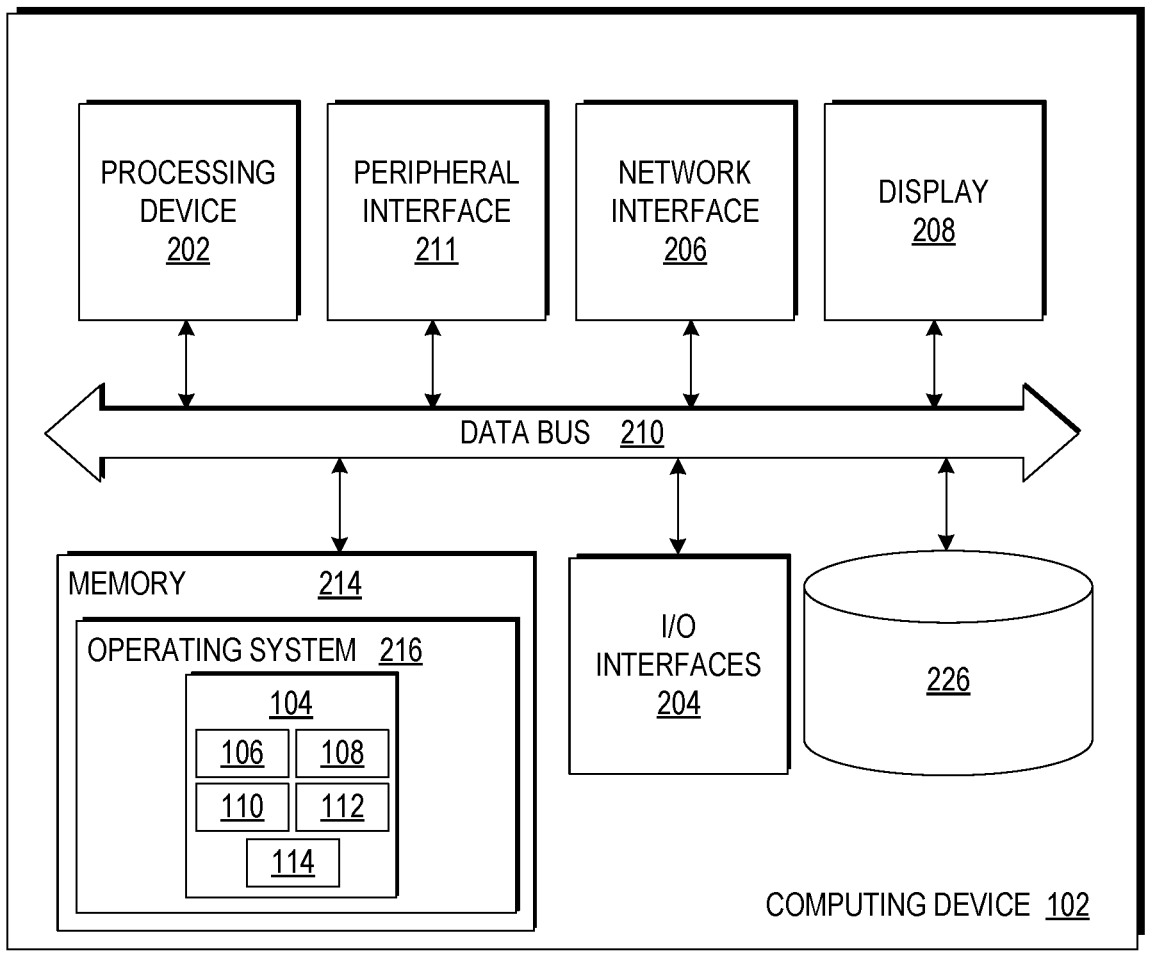
FIG. 2 is a schematic diagram of the computing device of FIG. 1 in accordance with various embodiments of the present disclosure.

FIG. 2 illustrates a schematic block diagram of the computing device 102 in FIG. 1. The computing device 102 may be embodied as a desktop computer, portable computer, dedicated server computer, multiprocessor computing device, smart phone, tablet, and so forth. As shown in FIG. 2, the computing device 102 comprises memory 214, a processing device 202, a number of input/output interfaces 204, a network interface 206, a display 208, a peripheral interface 211, and mass storage 226, wherein each of these components are connected across a local data bus 210.

The processing device 202 may include a custom made processor, a central processing unit (CPU), or an auxiliary processor among several processors associated with the computing device 102, a semiconductor based microprocessor (in the form of a microchip), a macroprocessor, one or more application specific integrated circuits (ASICs), a plurality of suitably configured digital logic gates, and so forth.

The memory 214 may include one or a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 216, one or more native applications, emulation systems, or emulated applications for any of a variety of operating systems and/or emulated hardware platforms, emulated operating systems, etc. For example, the applications may include application specific software which may comprise some or all the components of the computing device 102 displayed in FIG. 1.

In accordance with such embodiments, the components are stored in memory 214 and executed by the processing device 202, thereby causing the processing device 202 to perform the operations/functions disclosed herein. For some embodiments, the components in the computing device 102 may be implemented by hardware and/or software.

Input/output interfaces 204 provide interfaces for the input and output of data. For example, where the computing device 102 comprises a personal computer, these components may interface with one or more user input/output interfaces 204, which may comprise a keyboard or a mouse, as shown in FIG. 2. The display 208 may comprise a computer monitor, a plasma screen for a PC, a liquid crystal display (LCD) on a hand held device, a touchscreen, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

Figure 3:
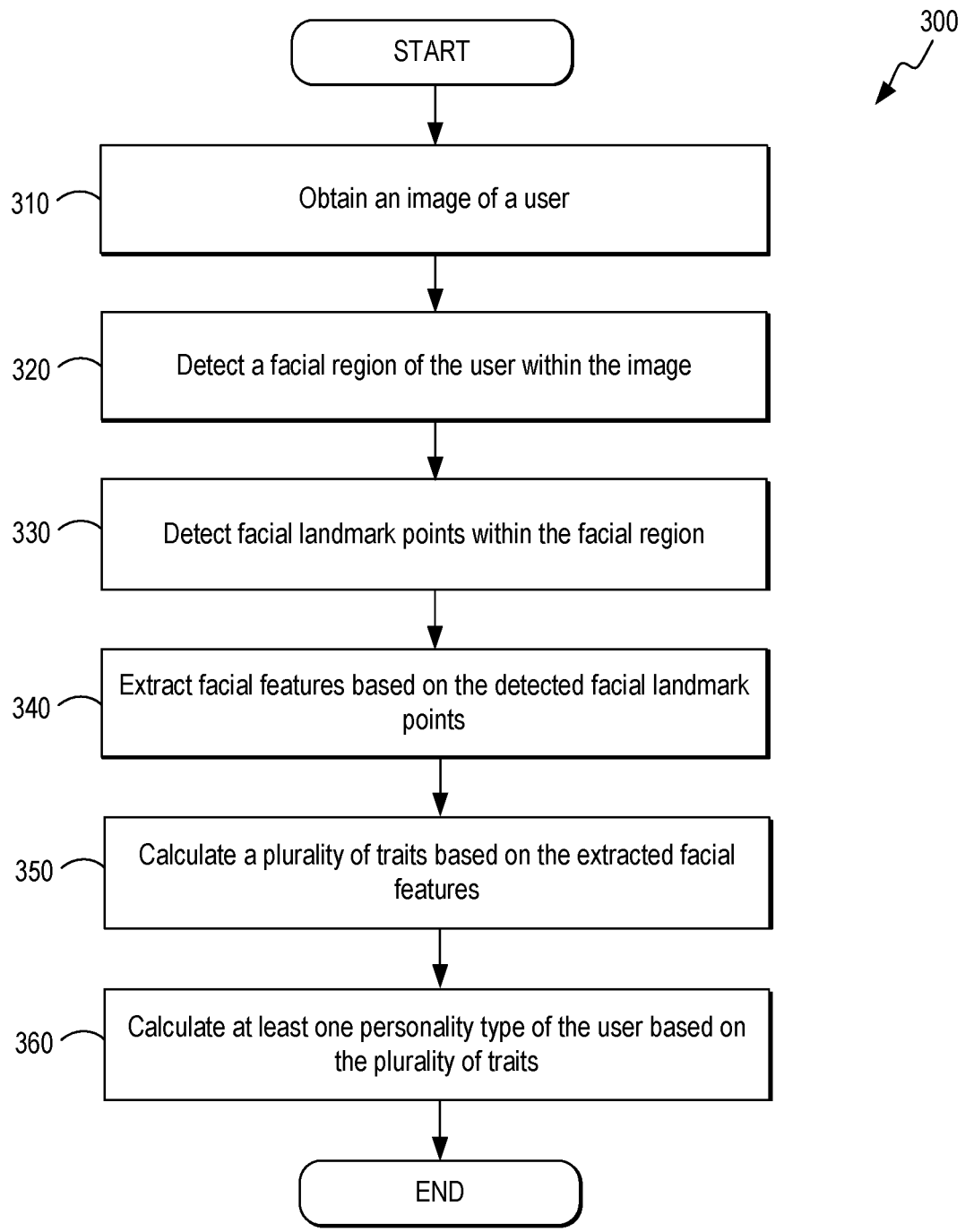
FIG. 3 is a top-level flowchart illustrating examples of functionality implemented as portions of the computing device of FIG. 1 for predicting a personality type using multi-tiered analysis according to various embodiments of the present disclosure.

Reference is made to FIG. 3, which is a flowchart 300 in accordance with various embodiments predicting personality using multi-tiered analysis, where the operations are performed by the computing device 102 of FIG. 1. It is understood that the flowchart 300 of FIG. 3 provides merely an example of the different types of functional arrangements that may be employed to implement the operation of the various components of the computing device 102. As an alternative, the flowchart 300 of FIG. 3 may be viewed as depicting an example of steps of a method implemented in the computing device 102 according to one or more embodiments.

Although the flowchart 300 of FIG. 3 shows a specific order of execution, it is understood that the order of execution may differ from that which is displayed. For example, the order of execution of two or more blocks may be scrambled relative to the order shown. In addition, two or more blocks shown in succession in FIG. 3 may be executed concurrently or with partial concurrence. It is understood that all such variations are within the scope of the present disclosure.

At block 310, the computing device 102 obtains an image of a user. At block 320, the computing device 102 detects a facial region of the user within the image. For some embodiments, the computing device 102 detects the facial region of the user within the image by obtaining a convolutional neural network model, where the convolutional neural network model is trained using images of facial regions. The computing device 102 then processes the image of the user using the convolutional neural network model to output the facial region.

At block 330, the computing device 102 detects facial landmark points within the facial region. For some embodiments, the computing device 102 detects the facial landmark points within the facial region by processing the facial region of the user using a second convolutional neural network model to output locations of the facial landmark points.

At block 340, the computing device 102 extracts facial features based on the detected facial landmark points. For some embodiments, the computing device 102 extracts the facial landmark points by applying a deep learning model to extract pre-determined target attributes for each of the facial features based on a corresponding facial landmark point. The pre-determined target attribute may include, for example, the style, type, and color of the hair. Other pre-determined target attribute may include, for example, the shape, cheekbone type, chin type, jaw type, and the aspect ratio of the face. Other pre-determined target attribute may include, for example, the shape, size, angle, and eyelid type of the eyes. Other pre-determined target attribute may include, for example, the shape, size, and aspect ratio of the ears.

At block 350, the computing device 102 calculates a plurality of traits based on the extracted facial features. For some embodiments, the computing device 102 predicts the plurality of traits based on the facial landmark points by generating a plurality of decision trees based on the facial landmark points, determining a plurality of trait scores for each decision tree, calculating a weighted sum of the plurality of trait scores to generate a final trait score, and determining at least one dominant trait based on the final trait score.

The weighted sum of the plurality of trait scores may be calculated using an average of the plurality of trait scores, a square of the sum of the plurality of trait scores, or a square root of the sum of the plurality of trait scores. The plurality of decision trees may be generated based on different combinations of facial features and/or different orders of facial features, where a root node of each decision tree corresponds to a different facial feature.

At block 360, the computing device 102 calculates at least one personality type of the user based on the plurality of traits. For some embodiments, the computing device 102 calculates the one or more personality types of the user based on the plurality of traits by generating a plurality of decision trees based on the facial features and determining a plurality of trait scores for each decision tree. The plurality of decision trees may be generated based on different combinations of facial features and/or different orders of facial features, where a root node of each decision tree corresponds to a different facial feature.

The computing device 102 calculates a weighted sum of the plurality of trait scores to generate a final trait score and determines the one or more personality types based on the final trait score. The weighted sum of the plurality of trait scores may be calculated using an average of the plurality of trait scores, a square of a sum of the plurality of trait scores, or a square root of the sum of the plurality of trait scores.

The computing device 102 determines the one or more personality types based on the final trait score by generating a graph comprising at least two nodes and a path between nodes, where each path of the graph corresponds to a weight value. The computing device 102 then applies a shortest path algorithm to the graph of trait scores and determines the one or more personality types of the user based on the final trait score corresponding to a shortest path identified by the shortest path algorithm.

For some embodiments, the computing device 102 may be further configured to retrieve one or more cosmetic product recommendations from a database based on the at least one personality type of the user. The database comprises a plurality of cosmetic products, where each cosmetic product has a weighted association value with a corresponding predefined personality type. For some embodiments, multiple personality types are calculated for the user, and the one or more cosmetic product recommendations are retrieved from the database based on a combination of the various personality types. Thereafter, the process in FIG. 3 ends.

Figure 9:
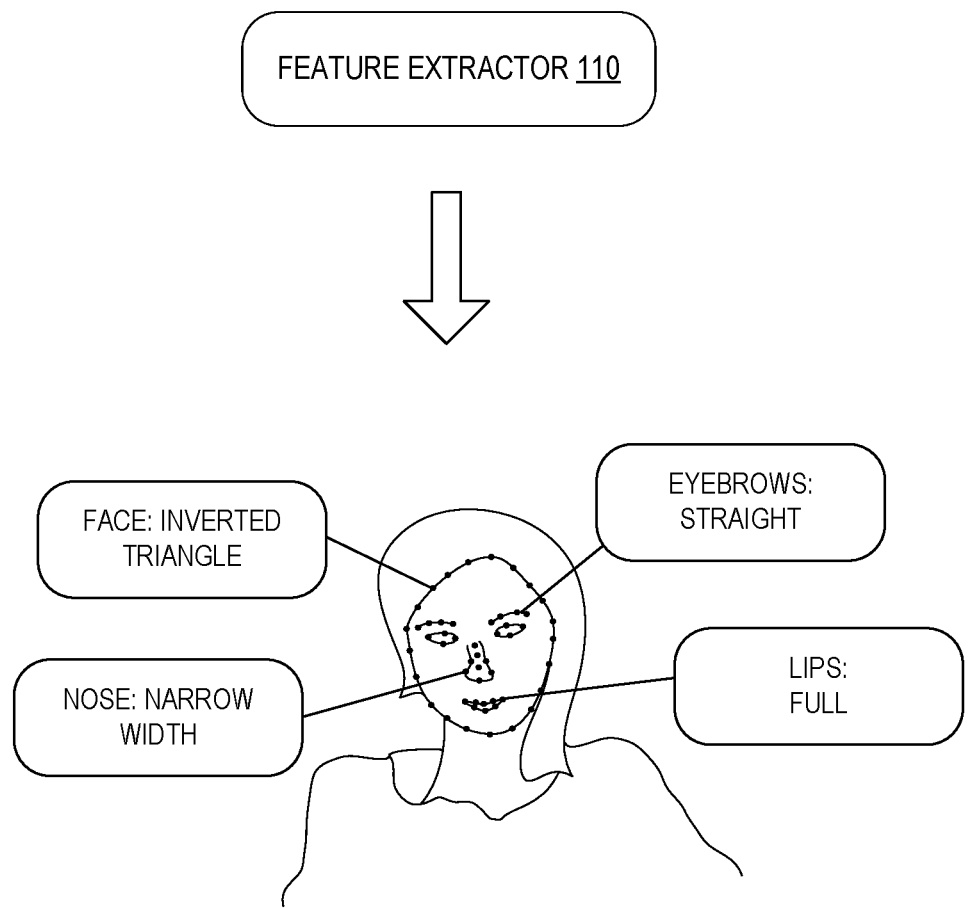
FIG. 9 illustrates example target attributes for various facial landmark points comprising the face, eyebrows, lips, and the nose of the user.

FIG. 9-12 illustrate an example where a personality type is predicted. FIG. 9 illustrates an example of target attributes for various facial landmark points comprising the face, eyebrows, lips, and the nose of the user. Note that the target attributes for other facial landmark points may be obtained. In the example shown, the feature extractor 110 determines that the user's face has the shape of an inverted triangle and that the user's nose has a narrow width. The feature extractor 110 also determines that the user has straight eyebrows and full lips.

Figure 10:
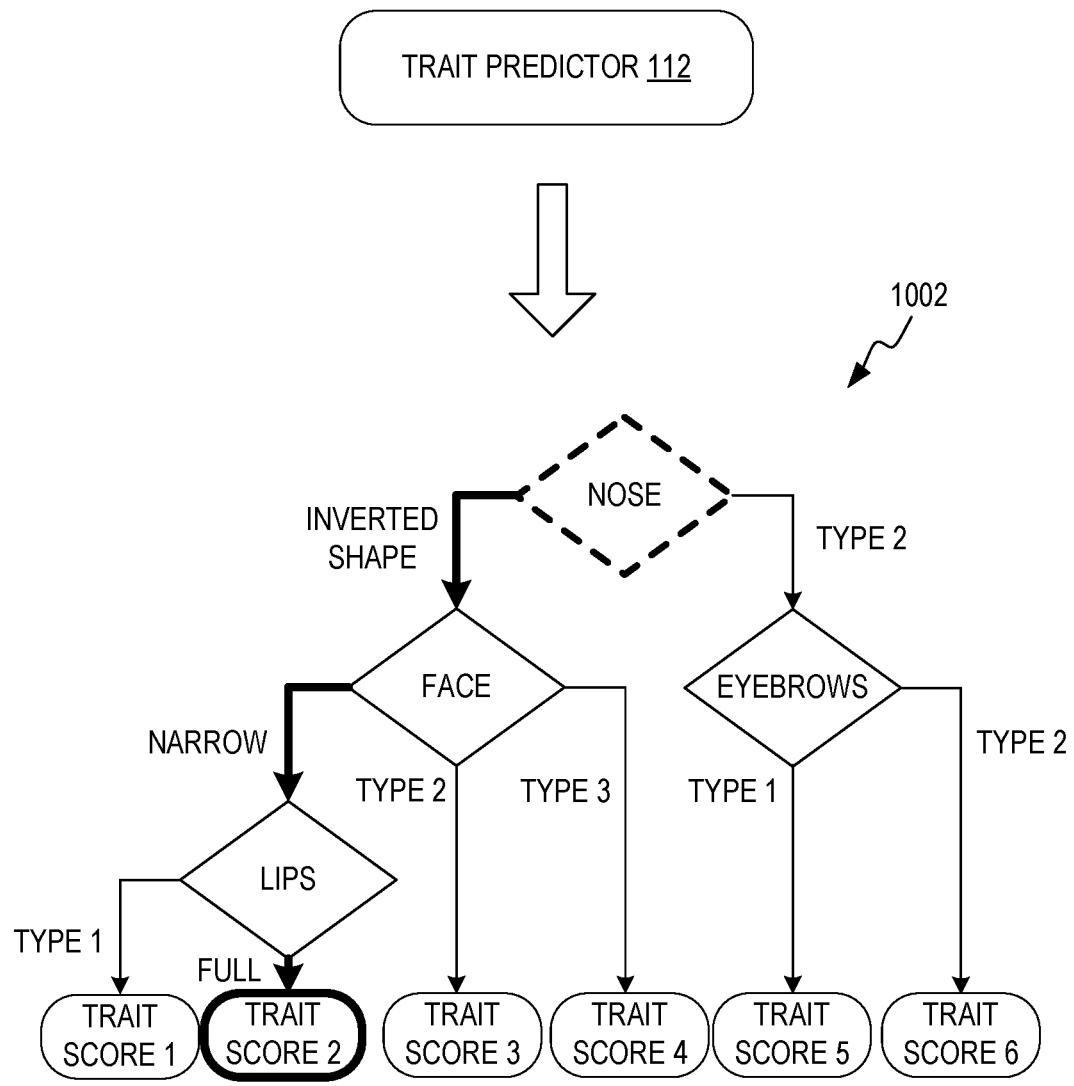
FIG. 10 illustrates an example decision tree where the nose is designated as the root node.

FIG. 10 illustrates a decision tree 1002 where the nose is designated as the root node. Based on the different attributes of the other facial landmark points, a trait score (Trait Score 2) is generated by the trait predictor 112. As described earlier, the trait predictor 112 may be configured to generate other decision trees based on different combinations of facial features and/or different orders of facial features, where a root node of each decision tree corresponds to a different facial feature. Different trait scores are then obtained for the different decision trees.

Figure 11:
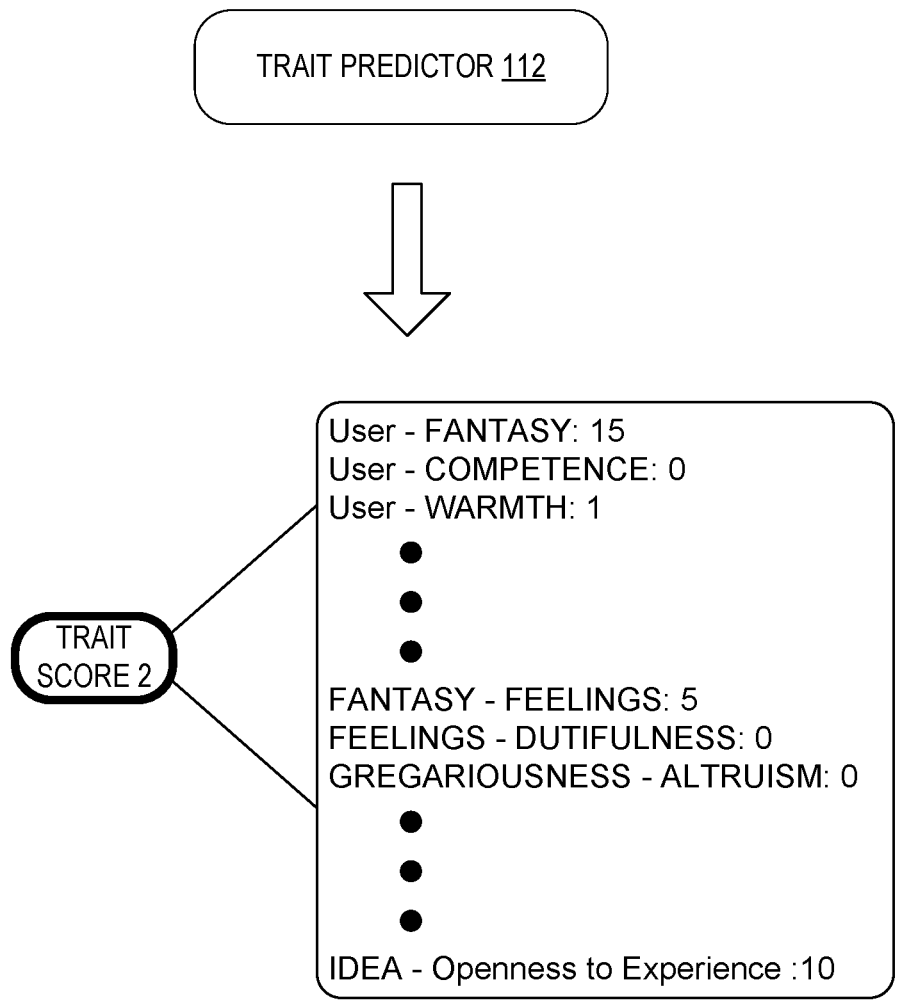
FIG. 11 illustrates an example where predetermined traits are associated with the trait score from FIG. 10.

FIG. 11 illustrates an example where predetermined traits are mapped to a given trait score. The numeric values shown in FIG. 11 correspond to pre-determined weight values that are utilized to predict the personality of the user based on attributes of facial landmark points. Each trait is assigned a pre-determined weight value where each weight value is derived according to statistical analysis performed by the trait predictor 112 (FIG. 1) or obtained by the trait predictor 112 from external sources.

Figure 12:
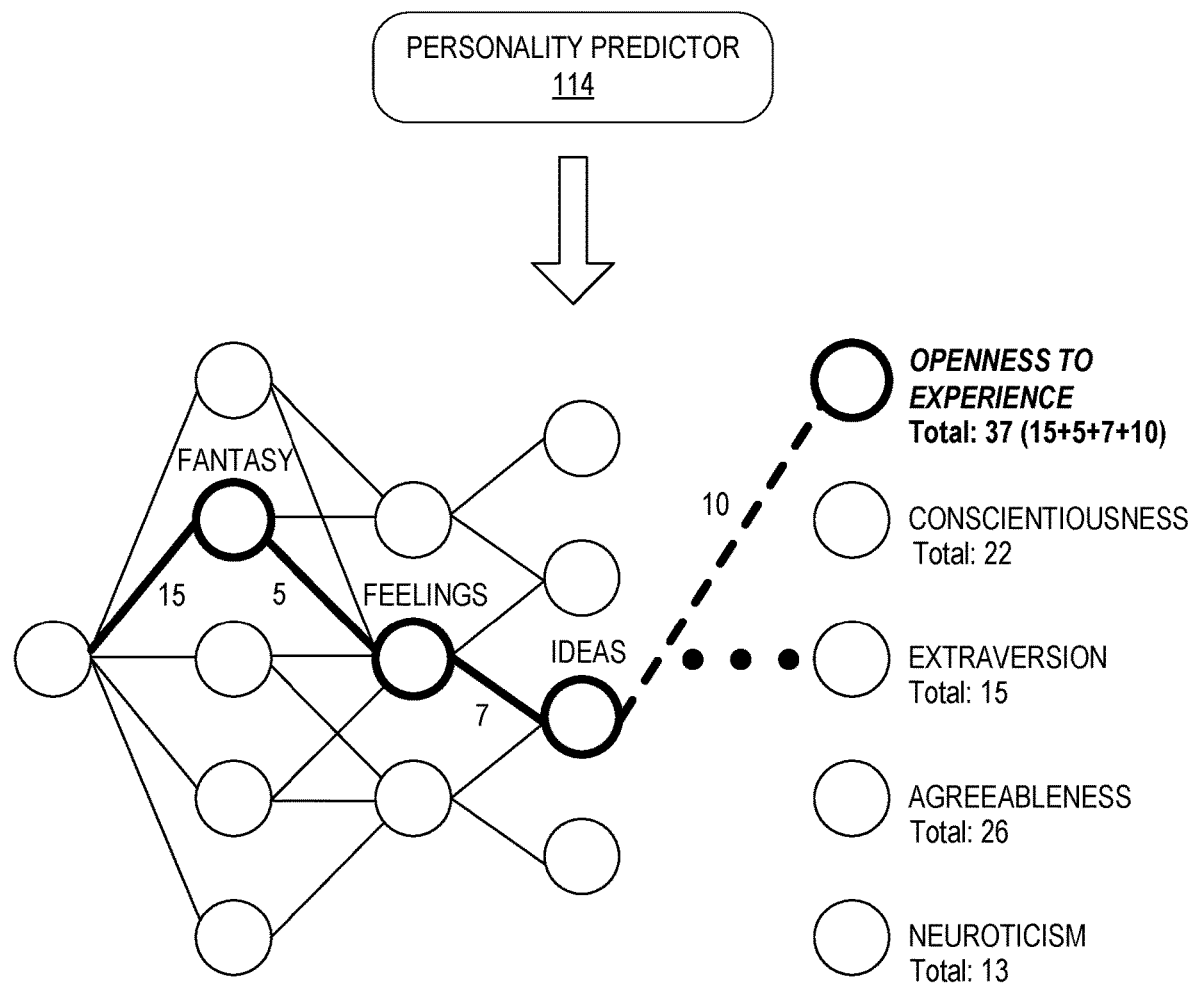
FIG. 12 illustrates an example graph where a personality type is predicted based on trait scores and where each node of the graph corresponds to traits associated with different trait scores according to various embodiments of the present disclosure.

FIG. 12 illustrates an example graph, where each node of the graph corresponds to traits associated with different trait scores and where a personality type is predicted based on trait scores. Each node of the graph corresponds to a different trait (e.g., fantasy, feelings). In the example shown, the weight values from FIG. 11 are shown in the paths or branches of the various traits in the graph (for example, User—FANTASY:15). The personality predictor 114 applies a shortest path algorithm to the graph of trait scores and predicts the personality of the user based on the trait scores corresponding to a shortest path identified by the shortest path algorithm. For example, the shortest path is found to be "openness to experience" for this particular user.

Figure 13:
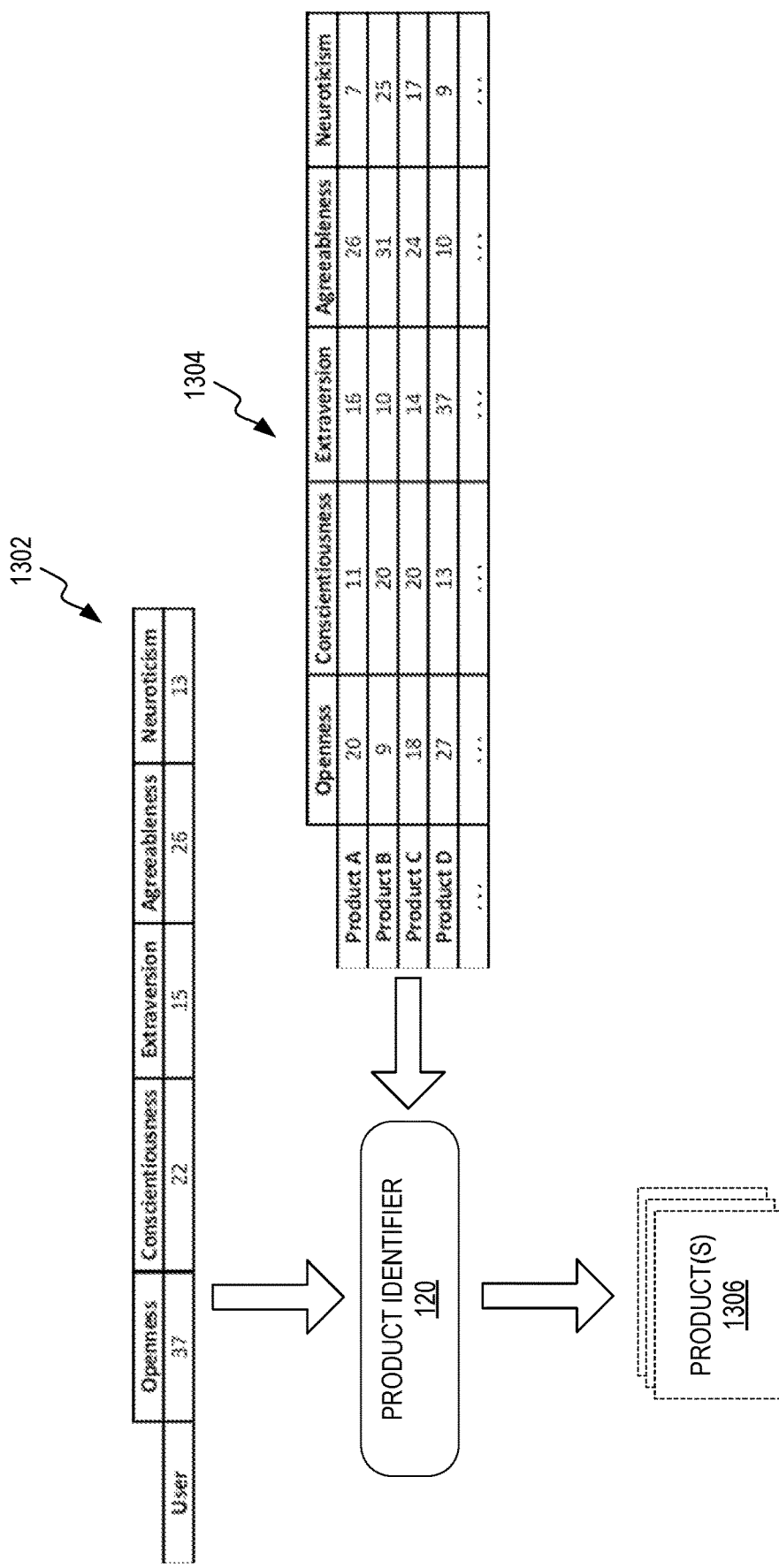
FIG. 13 illustrates a product identifier in the computing device of FIG. 1 accessing a predefined product database, where one or more products are recommended to the user based on a predicted personality type according to various embodiments of the present disclosure.

FIG. 13 illustrates the computing device 102 of FIG. 1 accessing an example predefined product database, where one or more products are recommended to the user based on a predicted personality type. For some embodiments, the personality prediction application 104 (FIG. 1) in the computing device 102 may further comprise a product identifier 120 configured to identify one or more closest matching products, as described below. In accordance with such embodiments, the product identifier 120 is configured to access a predefined product database stored in the data store 116 (FIG. 1), where the predefined product database comprises various cosmetic products and corresponding values. For such embodiments, the product identifier 120 executes a product-matching algorithm to calculate a closest match between a predicted personality type as shown, for example, in FIG. 12 and one or more products in the product database. The product identifier 120 may execute the product match algorithm by utilizing, for example, a dot product operation, a cosine similarity measurement, and/or a Euclidean distance measurement.

With reference to the example shown in FIG. 13, the user's personality scores 1302 derived in FIG. 12 and predefined product entries 1304 stored in a product database are obtained by the product identifier 120. The product identifier 120 then executes a product-matching algorithm to obtain one or more closest matching products 1306 from the product database. For some embodiments, the computing device 102 is further configured to present the one or more matching products 1306 as product recommendations to the user based on the user's predicted personality. In accordance with other embodiments, the product identifier 120 is configured to recommend one or more products based on a combination of the most dominant predicted personalities. Suppose, for example, that the personality predictor 114 identifies five possible personality types for the user. The product identifier 120 may be configured to recommend products based on the three most dominant personality types among the five possible personality types based on the values shown, for example, in FIG. 12.

Figure 14:
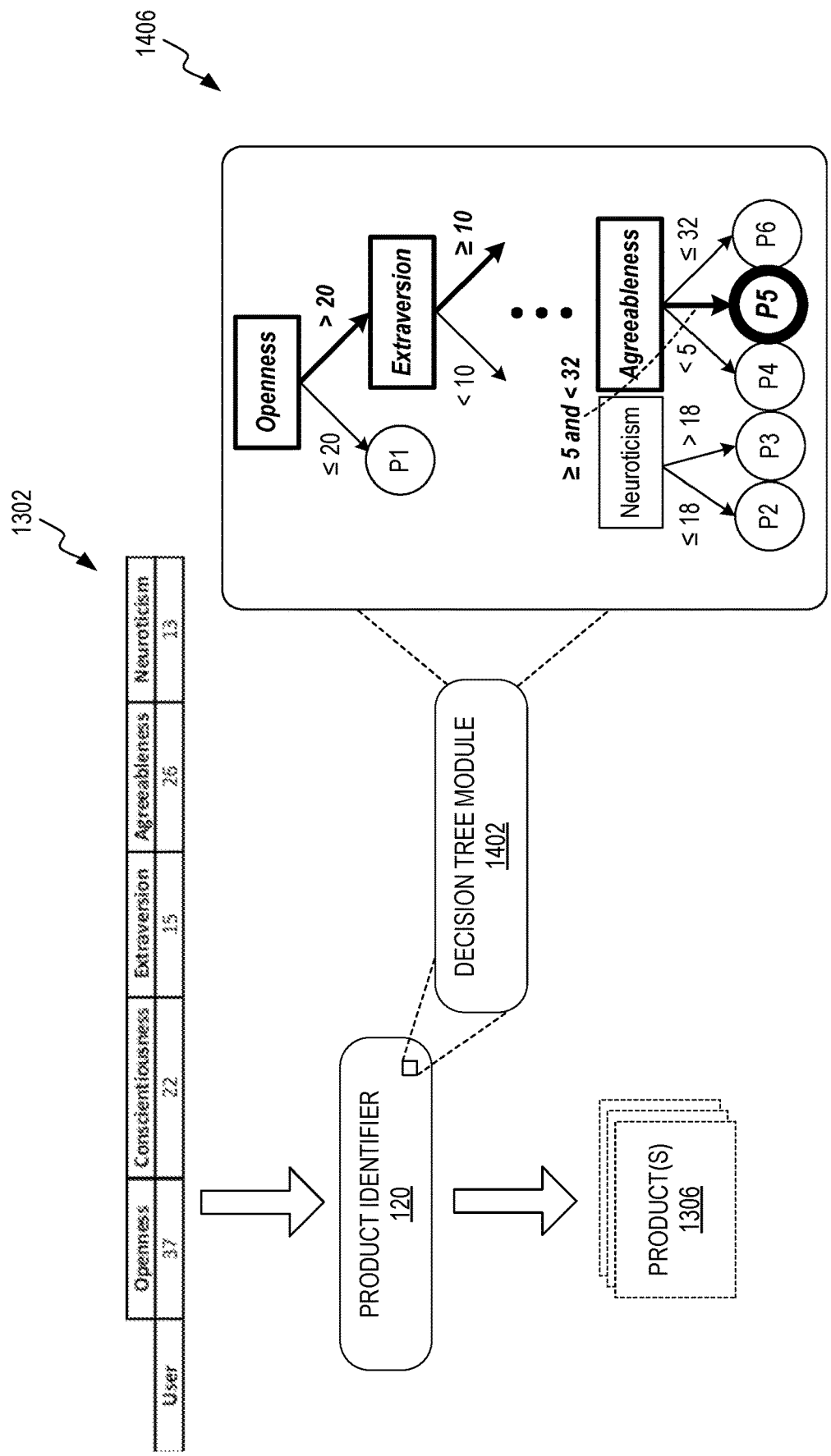
FIG. 14 illustrates application of a decision tree by the product identifier of FIG. 13 according to various embodiments of the present disclosure.

FIG. 14 illustrates application of a decision tree by the product identifier 120 of FIG. 13. For some embodiments, the product identifier 120 includes a decision tree module 1402 configured to receive the user's personality scores 1302 derived in FIG. 12. The decision tree module 1402 is further configured to apply a decision tree 1406 and obtain one or more product recommendations to the user. As discussed earlier, various predefined product entries 1304 are stored in a product database. In the example shown in FIG. 14, various product entries 1304 (P1, P2, P3, P4, P5, P6) are shown in the decision tree 1406. The decision tree module 1402 executing in the product identifier 120 traverses the decision tree 1406 based on the user's personality scores 1302. In the example shown, a final product (P5) is identified and presented to the user as a product recommendation based on the user's personality scores 1302.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A method implemented in a computing device, comprising:
   obtaining an image of a user;
   detecting a facial region of the user within the image;
   detecting facial landmark points within the facial region;
   extracting facial features based on the detected facial landmark points;
   calculating a plurality of traits based on the extracted facial features;
   calculating at least one personality type of the user based on the plurality of traits, wherein calculating the at least one personality type of the user based on the plurality of traits comprises:
      generating a plurality of decision trees based on the facial features;
      determining a plurality of trait scores for each decision tree;
      calculating a weighted sum of the plurality of trait scores to generate a final trait score; and
      determining the at least one personality type based on the final trait score, wherein determining the at least one personality type based on the final trait score comprises:
         generating a graph comprising at least two nodes and a path between nodes, wherein each path of the graph corresponds to a weight value;
         applying a shortest path algorithm to the graph of trait scores; and
         determining the at least one personality type of the user based on the final trait score corresponding to a shortest path identified by the shortest path algorithm; and
   retrieving at least one cosmetic product recommendation from a database based on a number of most dominant personality types among the at least one personality type of the user.

2. The method of claim 1, wherein detecting the facial region of the user within the image comprises:
   obtaining a convolutional neural network model, wherein the convolutional neural network model is trained using images of facial regions; and
   processing the image of the user using the convolutional neural network model to output the facial region.

3. The method of claim 2, wherein detecting the facial landmark points within the facial region comprises processing the facial region of the user using a second convolutional neural network model to output locations of the facial landmark points.

4. The method of claim 1, wherein extracting the facial features comprises applying a deep learning model to extract pre-determined target attributes for each of the facial features based on a corresponding facial landmark point.

5. The method of claim 1, wherein the plurality of decision trees are generated based on one or more of:
   different combinations of facial features; or
   different orders of facial features, wherein a root node of each decision tree corresponds to a different facial feature.

6. The method of claim 1, wherein each cosmetic product has a weighted association value with a corresponding predefined personality type.

7. The method of claim 6, wherein a plurality of personality types are calculated for the user, and wherein the at least one cosmetic product recommendation is retrieved from the database based on a combination of the plurality of personality types.

8. A method implemented in a computing device, comprising:
   obtaining an image of a user;
   detecting a facial region of the user within the image;
   detecting facial landmark points within the facial region;
   extracting facial features based on the detected facial landmark points;
   calculating a plurality of traits based on the extracted facial features;
   calculating at least one personality type of the user based on the plurality of traits, wherein calculating the at least one personality type of the user based on the plurality of traits comprises:
      generating a plurality of decision trees based on the facial features;
      determining a plurality of trait scores for each decision tree;
      calculating a weighted sum of the plurality of trait scores to generate a final trait score, wherein the weighted sum of the plurality of trait scores is calculated using one of: an average of the plurality of trait scores; a square of a sum of the plurality of trait scores; and a square root of the sum of the plurality of trait scores; and
      determining the at least one personality type based on the final trait score; and
   retrieving at least one cosmetic product recommendation from a database based on a number of most dominant personality types among the at least one personality type of the user.

9. A system, comprising:
   a memory storing instructions;
   a processor coupled to the memory and configured by the instructions to at least:
      obtain an image of a user;
      detect a facial region of the user within the image;
      detect facial landmark points within the facial region;
      extract facial features based on the detected facial landmark points;
      calculate a plurality of traits based on the extracted facial features;
      calculate at least one personality type of the user based on the plurality of traits, wherein calculating the at least one personality type of the user based on the plurality of traits comprises:
         generating a plurality of decision trees based on the facial features;
         determining a plurality of trait scores for each decision tree;
         calculating a weighted sum of the plurality of trait scores to generate a final trait score; and
         determining the at least one personality type based on the final trait score, wherein determining the at least one personality type based on the final trait score comprises:
            generating a graph comprising at least two nodes and a path between nodes, wherein each path of the graph corresponds to a weight value;

applying a shortest path algorithm to the graph of trait scores; and determining the at least one personality type of the user based on the final trait score corresponding to a shortest path identified by the shortest path algorithm; and retrieve at least one cosmetic product recommendation from a database based on a number of most dominant personality types among the at least one personality type of the use.

10. The system of claim 9, wherein the processor is configured to detect the facial region of the user within the image by:

obtaining a convolutional neural network model, wherein the convolutional neural network model is trained using images of facial regions; and processing the image of the user using the convolutional neural network model to output the facial region.

11. The system of claim 10, wherein the processor is configured to detect the facial landmark points within the facial region by processing the facial region of the user using a second convolutional neural network model to output locations of the facial landmark points.

12. A non-transitory computer-readable storage medium storing instructions to be implemented by a computing device having a processor, wherein the instructions, when executed by the processor, cause the computing device to at least:

obtain an image of a user;
detect a facial region of the user within the image;
detect facial landmark points within the facial region;
extract facial features based on the detected facial landmark points;
calculate a plurality of traits based on the extracted facial features; and
calculate at least one personality type of the user based on the plurality of traits, wherein calculating the at least one personality type of the user based on the plurality of traits comprises:
generating a plurality of decision trees based on the facial features;
determining a plurality of trait scores for each decision tree;
calculating a weighted sum of the plurality of trait scores to generate a final trait score; and
determining the at least one personality type based on the final trait score, wherein determining the at least one personality type based on the final trait score comprises:
generating a graph comprising at least two nodes and a path between nodes, wherein each path of the graph corresponds to a weight value;
applying a shortest path algorithm to the graph of trait scores; and
determining the at least one personality type of the user based on the final trait score corresponding to a shortest path identified by the shortest path algorithm; and retrieve at least one cosmetic product recommendation from a database based on a number of most dominant personality types among the at least one personality type of the user.

13. The non-transitory computer-readable storage medium of claim 12, wherein the processor is configured to detect the facial region of the user within the image by:

obtaining a convolutional neural network model, wherein the convolutional neural network model is trained using images of facial regions; and processing the image of the user using the convolutional neural network model to output the facial region.

14. The non-transitory computer-readable storage medium of claim 13, wherein the processor is configured to detect the facial landmark points within the facial region by processing the facial region of the user using a second convolutional neural network model to output locations of the facial landmark points.

15. A system, comprising:

a memory storing instructions;
a processor coupled to the memory and configured by the instructions to at least:
obtain an image of a user;
detect a facial region of the user within the image;
detect facial landmark points within the facial region;
extract facial features based on the detected facial landmark points;
calculate a plurality of traits based on the extracted facial features;
calculate at least one personality type of the user based on the plurality of traits, wherein calculating the at least one personality type of the user based on the plurality of traits comprises:
generating a plurality of decision trees based on the facial features;
determining a plurality of trait scores for each decision tree;
calculating a weighted sum of the plurality of trait scores to generate a final trait score, wherein the weighted sum of the plurality of trait scores is calculated using one of: an average of the plurality of trait scores; a square of a sum of the plurality of trait scores; and a square root of the sum of the plurality of trait scores; and
determining the at least one personality type based on the final trait score; and
retrieve at least one cosmetic product recommendation from a database based on a number of most dominant personality types among the at least one personality type of the user.

16. A non-transitory computer-readable storage medium storing instructions to be implemented by a computing device having a processor, wherein the instructions, when executed by the processor, cause the computing device to at least:

obtain an image of a user;
detect a facial region of the user within the image;
detect facial landmark points within the facial region;
extract facial features based on the detected facial landmark points;
calculate a plurality of traits based on the extracted facial features;
calculate at least one personality type of the user based on the plurality of traits, wherein calculating the at least one personality type of the user based on the plurality of traits comprises:
generating a plurality of decision trees based on the facial features;
determining a plurality of trait scores for each decision tree;
calculating a weighted sum of the plurality of trait scores to generate a final trait score, wherein the weighted sum of the plurality of trait scores is calculated using one of: an average of the plurality of trait scores; a square of a sum of the plurality of trait scores; and a square root of the sum of the plurality of trait scores; and determining the at least one personality type based on the final trait score; and retrieve at least one cosmetic product recommendation from a database based on a number of most dominant personality types among the at least one personality type of the user.

* * * * *